C. E. STEWART.
WARM AIR FURNACE.
APPLICATION FILED OCT. 5, 1909.

952,476.

Patented Mar. 22, 1910.

WITNESSES.
H. J. S. Young
L. Wheeler

INVENTOR.
C. E. STEWART.
by Fred B. Fetherstonhaugh
ATTY.

UNITED STATES PATENT OFFICE.

CHARLES E. STEWART, OF WOODSTOCK, ONTARIO, CANADA.

WARM-AIR FURNACE.

952,476.

Specification of Letters Patent. Patented Mar. 22, 1910.

Application filed October 5, 1909. Serial No. 521,100.

*To all whom it may concern:*

Be it known that I, CHARLES E. STEWART, of the city of Woodstock, in the county of Oxford, in the Province of Ontario, Canada, have invented certain new and useful Improvements in Warm-Air Furnaces, of which the following is a specification.

My invention relates to improvements in warm air furnaces and the object of the invention is to devise a means whereby a uniform and sufficient percentage of moisture may be supplied to the hot air entering the distributing pipes, and it consists essentially of an annular water pan located within the furnace casing and surrounding the fire pot below the radiators, means for rotatably supporting the pan in such position and a door in the furnace casing for supplying the water to the pan as hereinafter more particularly described by the following specification.

Figure 1:
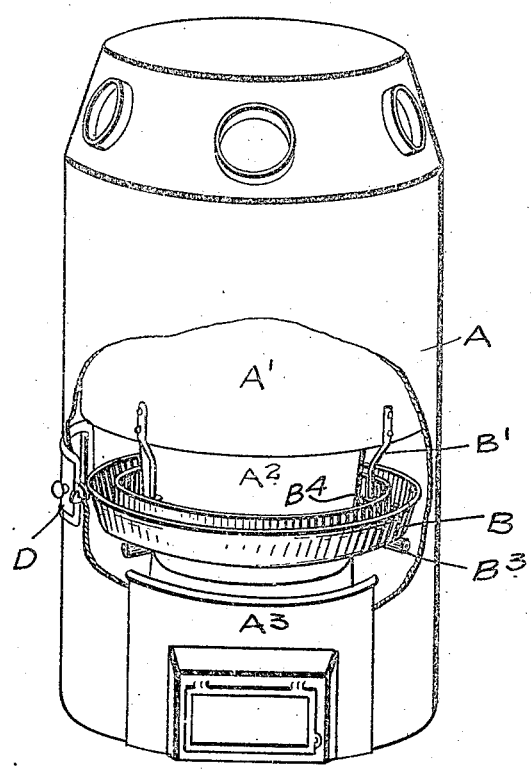
Figure 2:
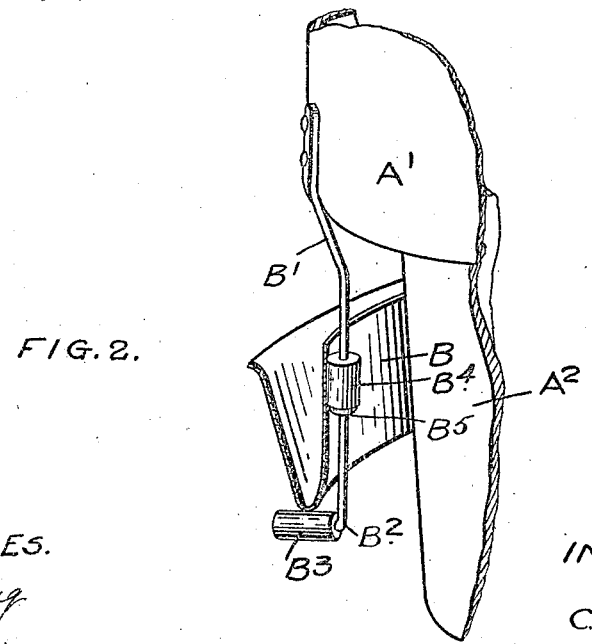

Figure 1, is a general perspective view of the furnace partially broken away and in section and showing my water pan in position. Fig. 2, is an enlarged perspective detail showing the means of supporting the water pan around the furnace.

In the drawings like letters of reference indicate corresponding parts in each figure.

A is the furnace casing of any usual form, A' the radiator, $A^2$ the fire pot and $A^3$ the ash pit casing.

B is my water pan of annular form and preferably tapering downwardly toward the bottom of the pan. The pan B is supported around the fire pot $A^2$ and at a suitable distance therefrom so as to allow the air to circulate all around the pan and draw moisture uniformly therefrom.

B' are depending hangers preferably secured on the radiator portion of the furnace and provided at their lower ends with right angular extensions $B^2$ on which are journaled bearing rolls $B^3$ on which the annular pan B is designed to rest.

$B^4$ are vertical rollers journaled on each of the vertical portions of the hangers B' such rollers being held in their vertical position by shoulders or collars $B^5$ secured to or forming part of the vertical portion of the hanger B'. By means of the rollers $B^4$ the water pan B is held in a proper central position so that it may be rotated around to any point desired for the purpose of cleaning the same.

D is a door formed in the casing A of the furnace. By means of the door access may be obtained to the water pan for the purpose of filling or cleaning the same. It will of course, be understood that the water pan may become foul from sediment settling from the water contained therein and it is therefore necessary that the operator should be able to bring any portion of the pan opposite the door and which he can do by my construction by merely rotating the pan around on its supporting rollers $B^3$.

Although I only show two sets of hangers and supporting rollers in the drawing of course, it will be understood that there will be three or four distributed around the circumference of the pan so as to evenly support the same.

It is a well known fact that humidity in the air is absolutely essential to health and it is also known that in furnaces hitherto constructed the water pans are not of a sufficient size to supply the required humidity and are so arranged as to make it impossible for them to supply such humidity uniformly to all the air passing into the distributing pipes of the building. In old constructions of furnaces and water pans the air which enters the distributing pipe directly above the water pan is only supplied with humidity, the air which passes through the other pipes being left dry. By my device as hereinbefore described it will be seen that all the warm air which passes through the furnace is uniformly supplied with humidity and to a far greater degree than by the small water pans that have been hitherto used. It will also be seen that my pan is readily accessible for cleaning and for supplying water thereto.

What I claim as my invention is:

1. In a warm air furnace, the combination with the fire pot and the furnace casing, of a water pan surrounding the fire pot, means for rotatably supporting the pan and a door in the casing whereby access is obtained to the pan, as and for the purpose specified.

2. In a warm air furnace, the combination with the fire pot and furnace casing provided with a suitable door, of an annular water pan surrounding the fire pot at a distance therefrom, hangers depending from a suitable portion of the furnace, and horizontal rollers journaled on the hangers and designed to support the water pan, as and for the purpose specified.

3. In a warm air furnace, the combination with the fire pot and the furnace casing provided with a suitable door, of an annular water pan surrounding the fire pot at a distance therefrom, hangers depending from a suitable portion of the furnace, horizontal rollers journaled on the hangers and designed to support the water pan, a vertical roller also journaled on the hangers and designed to bear against the inner periphery of the pan, as and for the purpose specified.

CHARLES E. STEWART.

Witnesses:
L. IZZARD,
U. M. KELLY.